I. W. WORLOW.
CHAIN TIGHTENER.
APPLICATION FILED APR. 6, 1921.
1,405,248.
Patented Jan. 31, 1922.
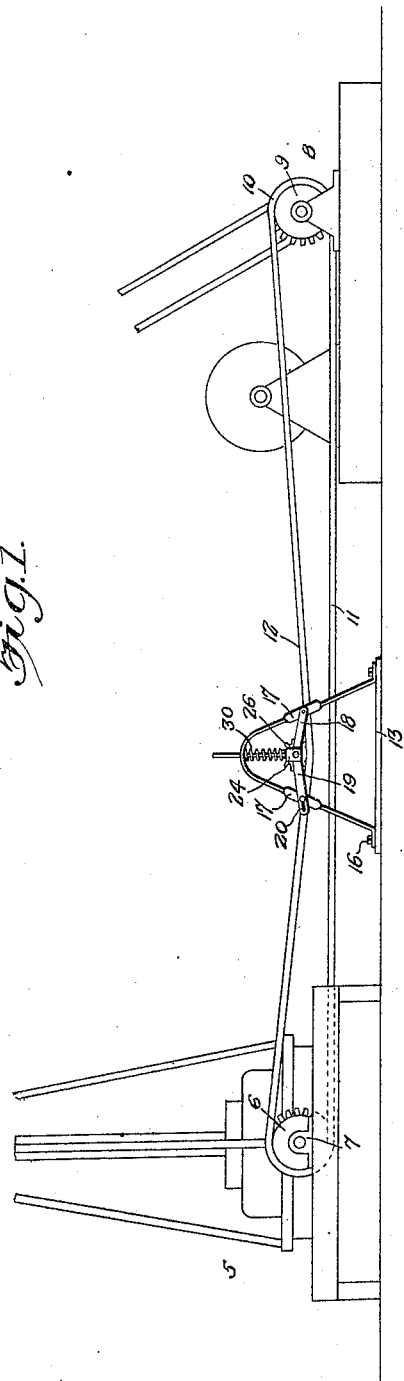
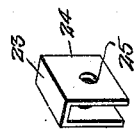
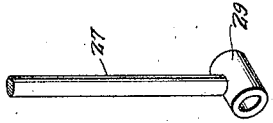
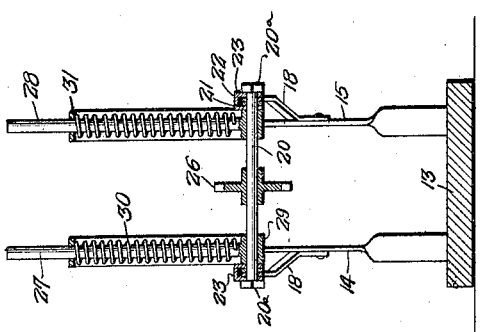
Inventor
I. W. Worlow,
By
Geo. P. Kimmel, Attorney

UNITED STATES PATENT OFFICE.

ISAAC W. WORLOW, OF WALTERS, OKLAHOMA.

CHAIN TIGHTENER.

1,405,248.     Specification of Letters Patent.     Patented Jan. 31, 1922.

Application filed April 6, 1921. Serial No. 459,172.

*To all whom it may concern:*

Be it known that I, ISAAC W. WORLOW, a citizen of the United States, residing at Walters, in the county of Cotton and State of Oklahoma, have invented certain new and useful Improvements in Chain Tighteners, of which the following is a specification.

This invention relates to a spring idler or chain tightener for a rotary drilling rig.

The primary object of the invention resides in the construction of a spring idler particularly designed for use in connection with rotary drilling machinery whereby the endless driven chain will be prevented from leaving the sprocket wheels and at all times be maintained taut thus overcoming any jerking due to hard drilling, and incidently saving wear and tear on the working parts.

One of the objects of the invention consists in the provision of a novel and improved spring idler designed for heavy drive chains such as is used on rotary drilling rigs wherein the tension of the upper chain may be properly maintained so that a direct pull will be had on the lower chain preventing the same from leaving the sprockets, resulting in more efficient operation of the drilling machinery and consequently saving time and labor.

Another and very important object of the invention will be found to reside in the construction of a chain tightener of the type above set forth which will be simple in construction, consisting of comparatively few parts therefor inexpensive to manufacture, practical and highly efficient in operation, strong and durable, capable of universal use in connection with various types of drilling machinery and otherwise constituting a very important yet necessary adjunct for its intended purpose wherever used.

With these objects in view and others which will be suggested and manifest as the purpose and nature of my invention are revealed in the following specification and drawings wherein I have shown a preferred embodiment thereof.

Figure 1 shows the invention as applied in use in connection with a rotary drilling rig.

Fig. 2 is a front view of the spring idler mechanism.

Fig. 3 is a perspective of one of the spring carrying arms.

Fig. 4 is a detail view of a connecting block.

Referring now to the drawings wherein like parts designate corresponding parts throughout the specification, 5 designates a rotary drilling rig which revolves very rapidly, being driven by the usual sprocket wheel 6 mounted in its bearings 7 from the draw works which I have designated in its entirety by numeral 8, said draw works being also provided with a sprocket 9 and of course receiving the endless chain 10 trained about the sprocket 7 above referred to.

In actual practice, the draw works are positioned at a considerable distance from the rotary drilling rig and consequently some provision must be had and introduced between the same to maintain the endless chain in a taut condition to prevent said chain from jumping or leaving the sprocket wheels so that the drilling machinery will not cease operating. The direct pull is on the bottom chain 11 and hence my novel and improved chain tightener is designed to depress or take up the slack in the upper chain 12 in the manner now to be described in detail.

The chain tightener structure which is interposed between the drilling rig and the draw works, primarily consists of a sill or base 13 to which is permanently secured the parallel, U-shaped supports 14, 15 which are each bolted as at 16 to said sill thus constituting a rigid structure. The U-shaped supporting members above referred to which are preferably made of metal are bent intermediate of their sides as shown at 17 having pivotally connected thereto the arms 18, 19 for supporting the intermediate shaft 20 as clearly shown in Fig. 2 of the drawing. It will be observed that the arm 19 is provided with a slot 20 near its outer end permitting relative movement of the respective arms and the shaft carried thereby for the purpose presently to appear.

The inner ends of the arms 21, 22, are provided with apertures therein, blocks 23 being adapted to straddle the ends of said arms, the vertical faces 24 of said blocks being also provided with apertures 25 for alignment with the apertures in the inner ends of the arms to receive the shaft 20 above referred to. By this construction, it will be readily seen that the shaft 20 which extends through and connects the ends of the arms is also held in position by the blocks 24 and due to the relative movement of the said arms, said shaft may be vertically adjusted to its proper position and maintain the upper chain 12 taut. Intermediate of the shaft 20 and between the supports, I have provided a freely rotatable sprocket wheel 26 beneath which the chain 12 travels and have also provided vertical supporting hangers 27, 28 which are in the nature of rods and provided with end bearings 29 for receiving the shaft 20, suitable resilient springs 30 being interposed between the top 31 of the support and the bearings 29 whereby considerable downward pressure may be exerted on the shaft 20 to maintain the sprocket 26 in engagement with the top chain 12 and thus keep the same taut. By reason of positioning the hangers and the resilient springs in the manner above indicated, it will be readily apparent that the tendency of the chain to become loose or slack is overcome whether it be due to stretching of the same or otherwise and furthermore by reason of the relative adjustment of the arms, the shaft may be raised or lowered to its adjusted position to properly move the freely rotatable sprocket wheel 26 carried thereby in engagement with the endless chain.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. A chain tightener comprising a support, arms attached to said support and connected intermediate the sides thereof, a shaft and idler sprocket carried thereby supported by said arms, and movable therewith, and means for exerting downward pressure on said shaft to maintain the idler sprocket in engagement with an endless chain.

2. A chain tightener comprising a support, separably connected arms pivotally attached to said support intermediate the sides thereof, a shaft and idler sprocket carried thereby supported by said arms between the support and means for exerting downward pressure on said shaft to maintain the idler sprocket in engagement with an endless chain.

3. A chain tightener comprising parallel supports adapted to be rigidly secured to a base, separably connected arms pivotally attached intermediate the sides of said supports, a horizontal shaft and idler sprocket carried thereby held by said arms and positioned between the supports, and means for exerting downward pressure on said shaft to maintain the idler sprocket in engagement with an endless chain.

4. A chain tightener comprising a pair of parallel, U-shaped supports adapted to be rigidly secured to a base, separably connected arms having apertures in their inner ends pivotally attached intermediate the sides of said supports and a connecting block provided with an aperture therein straddling the inner ends of said arms, a horizontal shaft and idler sprocket carried thereby passing through the connected ends of said arms and block and resilient means for maintaining the idler sprocket in engagement with an endless chain.

5. A chain tightener comprising a pair of parallel, U-shaped supports adapted to be rigidly secured to a base, separably connected arms having apertures in their inner ends, pivotally attached intermediate the sides of said supports, a connecting block straddling the inner ends of said arms and provided with apertures therein, a horizontal shaft and idler sprocket carried thereby passing through the ends of said arms and block, hangers provided with end bearings for said shaft extending through the top of the supports and resilient springs on the hangers interposed between the bearings and supports whereby the shaft and idler sprocket may be maintained in engagement with an endless chain.

In testimony whereof, I affix my signature hereto.

ISAAC W. WORLOW.